April 13, 1948.  T. E. McFALL  2,439,546
PISTON RING
Filed July 22, 1946  2 Sheets-Sheet 1

INVENTOR
THURLOW E. McFALL
BY Liverance and
Van Antwerp
ATTORNEYS

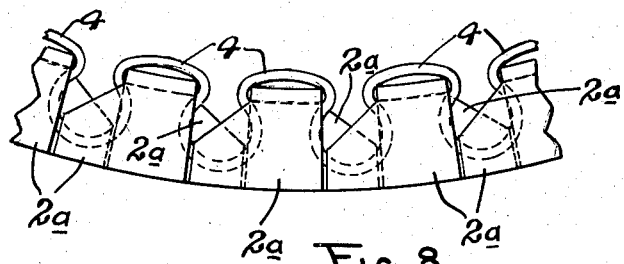
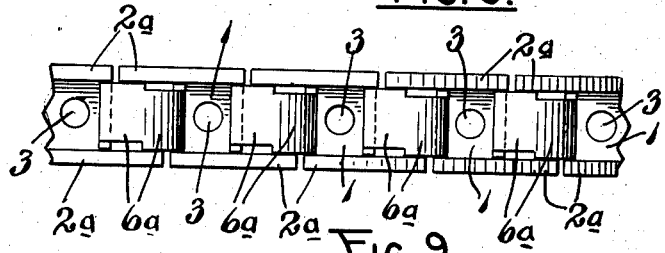
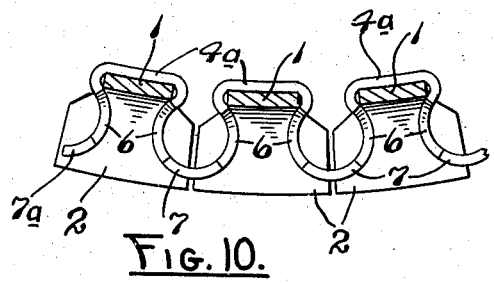
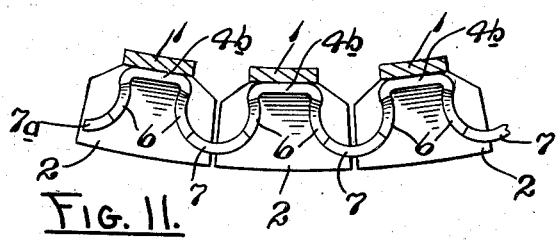
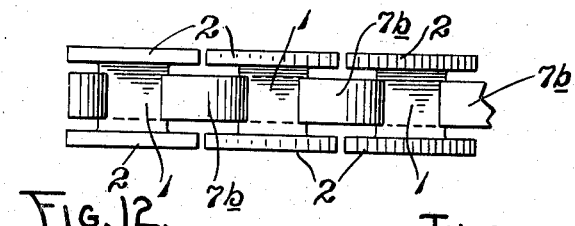

Patented Apr. 13, 1948

2,439,546

UNITED STATES PATENT OFFICE 2,439,546

PISTON RING

Thurlow E. McFall, Sparta, Mich.

Application July 22, 1946, Serial No. 685,471

2 Claims. (Cl. 309—45)

1

This invention relates to piston rings and has for its primary object and purpose the production of a novel, all-steel piston ring to be used in the lower oil groove or grooves of a piston in an internal combustion engine, the ends of the ring at the parting having an abutting engagement and the ring being circumferentially compressed and shortened in length when it is installed on a piston and within a cylinder. More specifically, the ring includes a continuous spring member which in circular form may be compressed, and a plurality of cylinder wall engaging or scraping elements, separate from each other and separately produced and assembled with the spring member, whereby the tension of the ring may be designed with reference solely to the spring member used, and the oil scraping and collecting members of the ring of any required dimensions for the most effective wall surface engagement without reference to the strength of the spring used, distinguishing from all-steel rings made from a single piece of metal in which, in general, either the oil scraping members are too narrow and therefore wear too fast in service, or the spring portion thereof is too heavy and provides too great a pressure against the cylinder wall surface with a danger of scoring or otherwise damaging the cylinder walls; while of course an exceedingly high unit pressure is produced with the result that the ring has a short life of service.

My invention, in a practical, novel and economical manner, obviates such disadvantages and provides a ring of required life of service, having high oil conserving functions.

An understanding of the invention may be had from the following description, taken in connection with the accompanying drawings, in which, Fig. 1 is a perspective view of a portion of the piston ring made in accordance with my invention, and with the outline of the complete ring diagrammatically shown.

Fig. 8 is a fragmentary plan view of the ring showing the wall engaging members in another form, wherein their upper and lower radial lines or separation are staggered.

Fig. 9 is a front elevation thereof.

Fig. 10 is a fragmentary horizontal section through a slightly modified construction of the ring.

Fig. 11 is a similar view of a still further modified form, and

Fig. 12 is a fragmentary front elevation showing the ring with a modified form of spring structure.

Like reference numbers refer to like parts in the different figures of the drawings.

Figure 1:
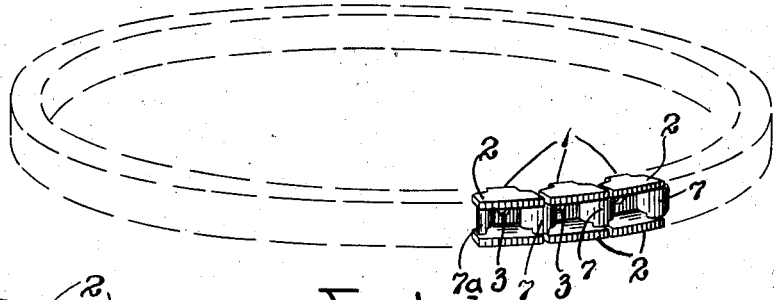

The wall engaging members, as shown in Figs. 1 to 7 inclusive, are each made from a blank of metal having a central section 1 from opposite sides of which wider wings 2 identical in shape extend, the central portion 1 having an opening 3 therethrough. Each of said wall engaging members of the ring is bent and formed into substantially U-shape, with the central sections 1 disposed vertically and the wings 2 bent at right angles therefrom in the same direction to provide upper and lower spaced apart wall engaging flanges. The edges of said flanges are of arc shape to conform to the inner curved surface of the cylinder wall of an internal combustion engine in which the ring is installed; and the side edges are on radii extending to the center of the installed ring.

The spring member on which the wall engaging members are carried is formed from a length of flat spring material (Fig. 6) in which there are a plurality of sections 4 of the full width of the band of spring metal used, and each of which preferably has a centrally disposed opening 5 therethrough. From each end of each section 4 a section 6 extends, narrower in width than said sections 4, the metal being removed at both upper and lower edges in each section 6. Any two sections 6 extending from adjacent ends of successive sections 4 are integrally connected with opposite ends of an intervening section 7, shorter in length than the sections 4 but having the same width. Said spring member at each end terminates in a half section 7a, so that when the two ends at the parting of the ring are brought together (Fig. 5), the adjacent vertical edges of the parts 7a are brought nearly together.

Figure 5:
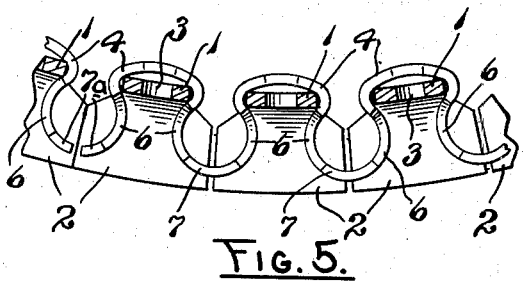
Fig. 5 is a fragmentary horizontal section through the ring at the parting.
Figure 6:
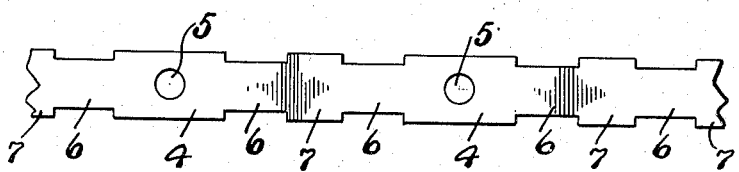
Fig. 6 is a fragmentary elevation of the spring member used, prior to its loop formation.
Figure 7:
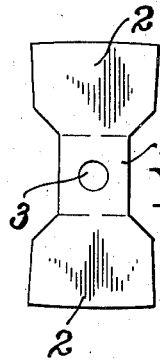
Fig. 7 is a plan of the blank of the wall engaging members of the ring, a plurality of which are used with each ring.

Said band of spring material is shaped and formed into a continuous series of alternate loops as shown in Fig. 5, the sections 7 each being at the forward sides of the forwardly extending loops and the sections 4 at the rear of the rearwardly extending loops, with sections 6 curving toward each other. The loops consisting of the parts 4 and 6 receive the wall engaging members, the parts 1 being pressed between the adjacent sections 6 and gripped in the bends at the ends of the longer sections 4, with the openings 3 and 5 in substantially radial alinement. The wings or flanges 2 bridge across the sections 6 at both the upper and lower edges, thus providing oil passing slots in addition to the oil passing openings 3 and 5.

Figure 3:
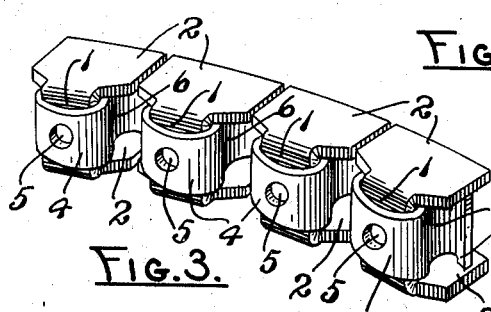
Fig. 3 is a similar view looking at the inner or back side of the ring.
Figure 2:
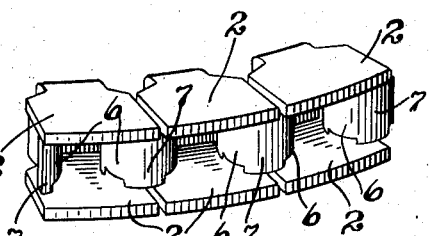
Fig. 2 is an enlarged fragmentary perspective view of the piston ring at one end or the parting thereof.
Figure 4:
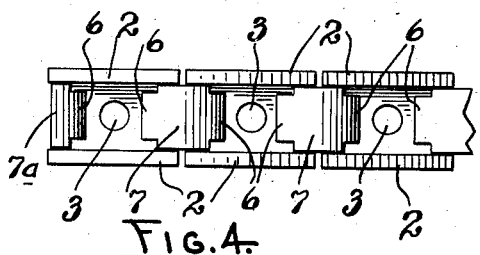
Fig. 4 is a fragmentary front elevation.

The assembled spring member and wall engaging members, as shown in Figs. 2 and 3, provide a piston ring which is contractable circumferentially to smaller diameter by a shortening of the spring member which bends the loops toward each other and which may bring the adjacent edges of the legs or flanges 2 closer together so that when held within the confines of a cylinder wall, substantially upper and lower bearing ribs of continuous length are made by the outer edges of the flanges of edges 2. This provides the tension which causes the necessary pressure of the edges 2 against the cylinder wall. It is evident that the flanges are supported and held against bending toward each other by the sections 7 and 7a, which extend the distance between said flanges, in effect making supporting struts between said upper and lower flanges preventing their distortion.

In Figs. 1 to 7 inclusive the flanges 2 extend from the intermediate portion 1 in the same direction and the edges are located one directly over the other. In Figs. 8 and 9 the members which supply the flanges to bear against the cylinder wall are offset laterally in opposite directions from the vertical portions 1, the upper flange having a laterally offset portion to the left and the lower flange to the right as shown in Figs. 8 and 9. The portions of the spring between the sections 4 are modified to provide two sections 6a which take the places of the two parts 6 and 6a being narrowed at its lower edge and the other at its upper edge. This staggers the joints between the upper and lower flanges 2a instead of being directly over each other.

In Fig. 10 the structure is substantially the same as shown in Figs. 1 to 7 inclusive, being changed in that the gripping portions 4a instead of being curved as shown in Fig. 5 are flattened to lie against the inner sides of the vertical parts 1 of the cylinder wall bearing members.

In Fig. 11, instead of passing around and gripping said portions 1, the sections 4b between the sections 6 are shortened in length and flattened to bear against the outer sides of the parts 1 and are permanently secured thereto. Such permanent connection may be by riveting, welding or any other equivalent workable form of connection.

In Fig. 12, the width of the spring member is narrowed and of the same width for its entire length, the loops 7b being short at both their upper and lower edges from the adjacent sides of the flanges 2. This provides full venting for the ring for oil passage, but removes the support for the bearing flanges 2 which however, when made of sufficiently sturdy material will not normally spring or bend toward each other so as to take a permanent set.

With the invention as described, the tension of the ring when in use, and the pressure of the flange edges against the cylinder wall is governed solely by the strength of the continuous spring member, the thickness and width of which may be varied without reference to the thickness dimension of the wall bearing flanges 2 and 2a. Such wall bearing flanges and the vertical members 1 between them may be made of any desired thickness. The bearing area needed against the cylinder wall is obtained without unduly or in any way effecting the spring tension against the cylinder wall, as is the case of all steel piston rings contractable circumferentially when made of a single piece of material. Also the material of the spring member and of the wall bearing members may be of a different composition and different properties. This obviates the great wear which occurs because any attempt to increase the bearing surface requires that the strength of the spring must be increased; while a reduction of the strength of the spring will correspondingly reduce the bearing area against the walls in the one piece rings.

The ring is particularly efficient in oil conservation, readily manufactured, assembled and installed and economical to produce.

The invention is defined in the appended claims and is to be considered comprehensive of all forms of structure coming within their scope.

I claim:

1. A piston ring structure comprising, a spring member consisting of a single length of thin flat spring material having alternate inwardly and outwardly extending curved loops, with adjacent sides of the outwardly extending loops in closer proximity to each other than the sides of the inwardly extending loops, said spring member having a shape of substantially circular outline with the ends thereof in close proximity to each other, and a plurality of cylinder wall engaging members one for each of the inwardly extending loops each of said cylinder engaging members comprising an intermediate vertical section of flat metal having substantially vertical edges and widened flanges extending outwardly from the upper and lower edges of said vertical sections, said vertical sections being disposed in and gripped by the sides of said inwardly extending loops and extending over and at their outer edges beyond said outwardly extending loops.

2. In a piston ring, a spring member disposed in substantially circular form and having alternate inwardly and outwardly extending loops, and a plurality of cylinder wall engaging members, each having a vertical intermediate section and upper and lower outwardly extending flanges, said vertical intermediate sections extending through said inwardly extending loops with the flanges extending outwardly over and underneath said outwardly extending loops.

THURLOW E. McFALL.

REFERENCES CITED

The following references are of record in the file of this patent:

UNITED STATES PATENTS

| Number | Name | Date |
|---|---|---|
| 2,280,744 | Bowers | Apr. 21, 1942 |
| 2,310,098 | Zahodiakin | May 11, 1943 |